United States Patent
Rekimoto

(10) Patent No.: US 9,772,548 B2
(45) Date of Patent: Sep. 26, 2017

(54) TRANSMISSION DEVICE, TRANSMISSION METHOD, RECEPTION DEVICE, RECEPTION METHOD, COMMUNICATION SYSTEM, AND COMMUNICATION METHOD

(75) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 13/096,312

(22) Filed: Apr. 28, 2011

(65) Prior Publication Data

US 2011/0299857 A1    Dec. 8, 2011

(30) Foreign Application Priority Data

Jun. 2, 2010    (JP) ................................ 2010-127079

(51) Int. Cl.
| | |
|---|---|
| H04B 10/00 | (2013.01) |
| G03B 21/26 | (2006.01) |
| H04B 10/114 | (2013.01) |
| H04B 10/116 | (2013.01) |

(52) U.S. Cl.
CPC ........... *G03B 21/26* (2013.01); *H04B 10/116* (2013.01); *H04B 10/1149* (2013.01)

(58) Field of Classification Search
USPC ................................................ 398/172, 188
See application file for complete search history.

(56) References Cited

U.S. PATENT DOCUMENTS

| | | | | |
|---|---|---|---|---|
| 5,793,880 | A * | 8/1998 | Constant | H04N 21/4382 340/815.4 |
| 7,689,130 | B2 * | 3/2010 | Ashdown | 398/172 |
| 2002/0054411 | A1 * | 5/2002 | Heminger et al. | 359/159 |
| 2004/0161246 | A1 * | 8/2004 | Matsushita et al. | 398/187 |
| 2006/0056855 | A1 * | 3/2006 | Nakagawa et al. | 398/183 |
| 2006/0214815 | A1 * | 9/2006 | Komatsu | H04B 10/1143 340/956 |
| 2006/0239675 | A1 * | 10/2006 | Iizuka et al. | 396/287 |
| 2007/0084927 | A1 * | 4/2007 | Itou et al. | 235/454 |
| 2008/0055246 | A1 * | 3/2008 | Okayama | H04N 9/3194 345/158 |
| 2009/0129781 | A1 * | 5/2009 | Irie et al. | 398/98 |
| 2009/0180781 | A1 * | 7/2009 | Harper et al. | 398/130 |
| 2009/0190926 | A1 * | 7/2009 | Charlet et al. | 398/74 |

\* cited by examiner

*Primary Examiner* — Ken N Vanderpuye
*Assistant Examiner* — David Lambert
(74) *Attorney, Agent, or Firm* — Chip Law Group

(57) ABSTRACT

There is provided a transmission device including an optical signal generation section configured to generate an optical signal formed by arranging one or more of each of a plurality of kinds of same-color light beams each having different phase, and a transmission section configured to transmit the optical signal generated by the optical signal generation section.

20 Claims, 10 Drawing Sheets

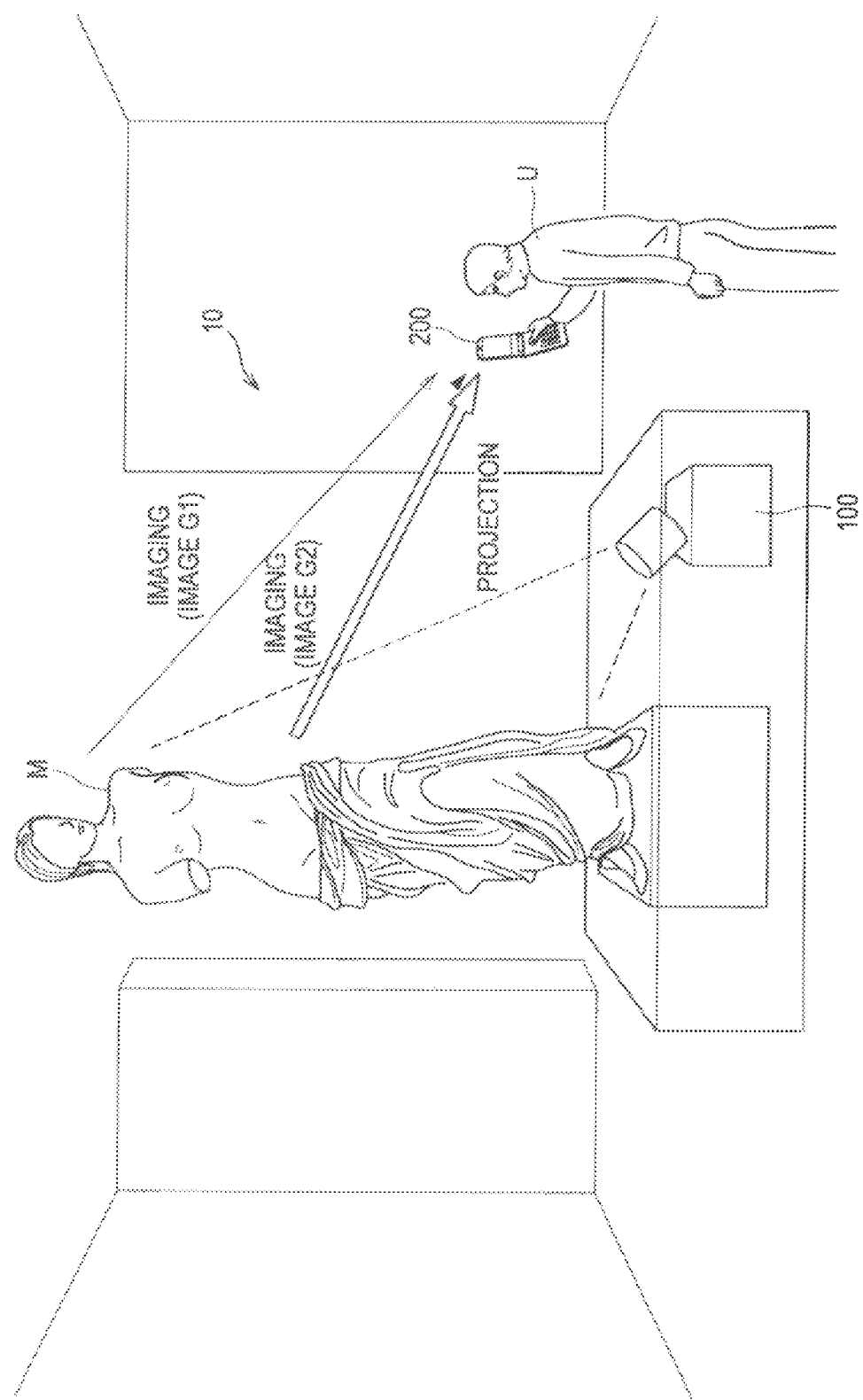

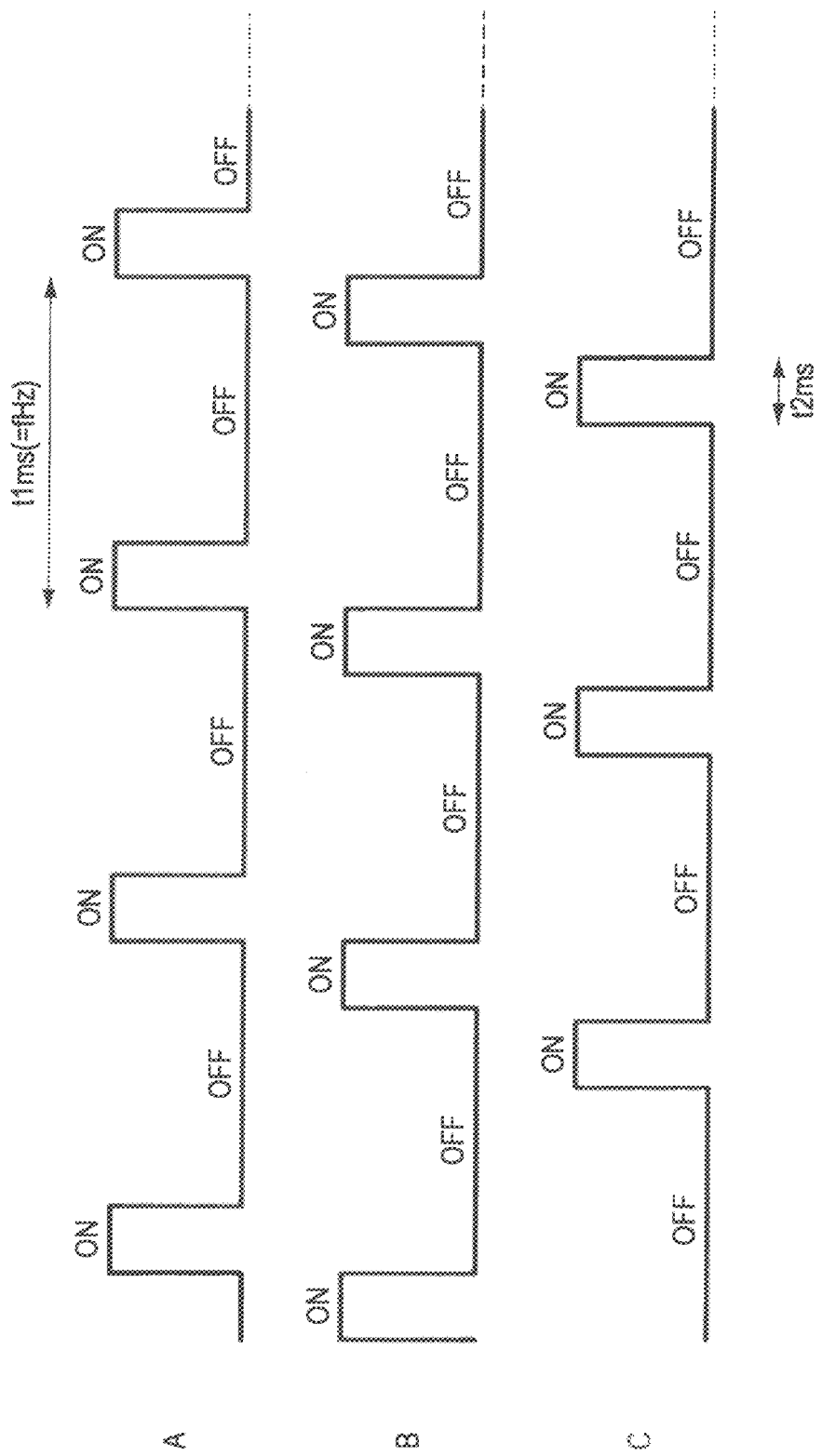

FIG.5

| ID | IMAGE G1 | IMAGE G2 |
|---|---|---|
|  | BABAB | AABAB |
| DISPLAY EXAMPLE | [251] About Head of Statue — The size of the head is small, and it is said that the figure is realized in the eight-head proportion. | [251] About Torso of Statue — Absence of the arms gives you the impression that the outline of the torso is emphasized. |

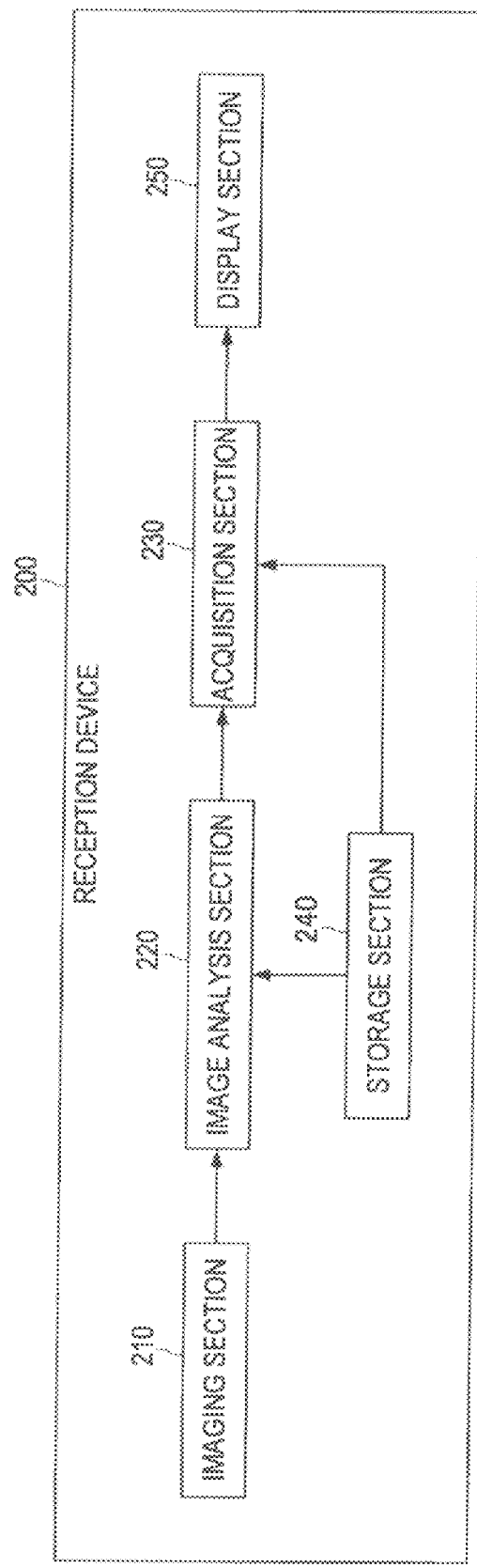

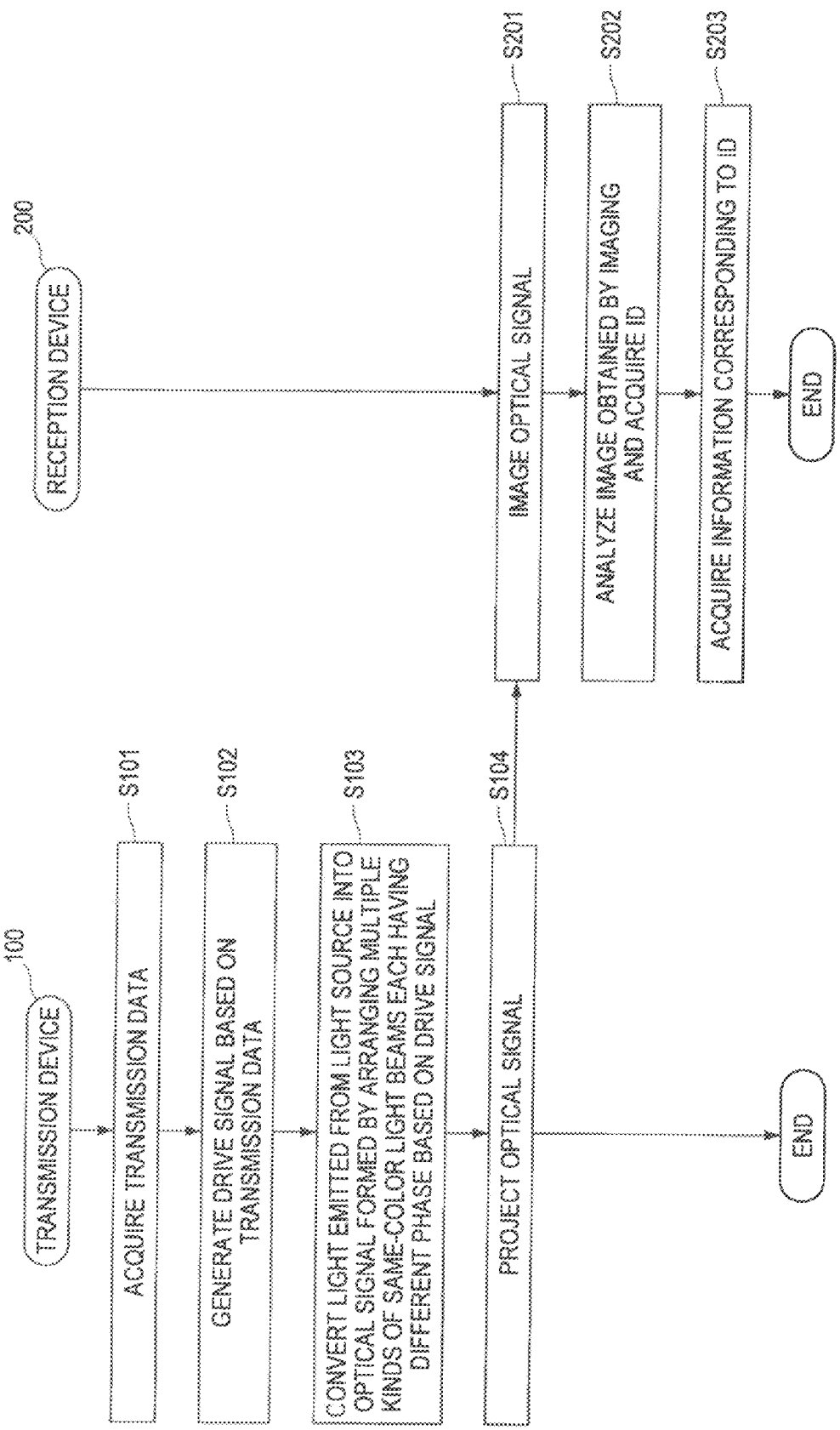

TRANSMISSION DEVICE, TRANSMISSION METHOD, RECEPTION DEVICE, RECEPTION METHOD, COMMUNICATION SYSTEM, AND COMMUNICATION METHOD

BACKGROUND

The present disclosure relates to a transmission device, a transmission method, a reception device, a reception method, a communication system, and a communication method.

In recent years, there have been cases where, in digital signage and an advertisement, a bar code such as a QR code (registered trademark) is embedded into information shown to a user for attracting the user's attention to a website and the like. The bar code is embedded into the information in a form that a bit pattern obtained by encoding letters and numbers can be seen by the human eye. Accordingly, for example, when a position at which it is visually recognized by the user that the bit pattern is embedded is imaged by a camera provided to a mobile phone, and an image obtained as a result of the imaging is analyzed by the mobile phone, the bit pattern may be converted into a URL (Uniform Resource Locator) for specifying a website, a telephone number, and the like.

According to such a technique, the user can, even if the user does not have a special bar code reader, use the camera for the imaging purpose provided to the mobile phone as the bar code reader. With such an advantage, a bar code imaged by a camera is in widespread use. However, since the bar code is used by being embedded into information in a form that can be identified by the human eye, when the bar code has a size of a certain level or more, the beauty of the advertisement and the like that is the information into which the bar code is embedded is spoiled. On the other hand, unless the bar code has a size of a certain level or more, it becomes difficult for the user to recognize a position at which the bar code is embedded and to grasp the position to be imaged.

Further, a technique called visible light communication in which data is transmitted using visible light that is viewable by the human eye is drawing attention (for example, see JP2009-290359A). The influence of the visible light communication on the human body is less than the influence of communication using radio waves or infrared rays on the human body, and, in addition, the visible light communication has a feature that a position capable of receiving data can be confirmed with the human eye.

As a device for emitting the visible light in the visible light communication, there is used an LED (Light Emitting Diode), for example. This is mainly because, since the LED is a semiconductor device, the LED is capable of modulating the light emitted from the LED at such high speed that it is difficult for a human to identify the light, and is capable of transmitting data at high speed as an optical signal. Therefore, for example, when the light emitted from the LED is used as the light used for an illumination, a display, and the like, the possibility can be reduced that the beauty of the advertisement and the like is spoiled, and, also, the illumination and the display can be used as a transmission device for transmitting data.

SUMMARY

However, in the case of performing the visible light communication, the light projected from the transmission device is modulated at high speed, and hence, there arises a necessity to provide a reception device with a special configuration such as a special photosensor or a high-speed camera. With such a special configuration, the reception device can image the light projected from the transmission device at high frame rate, and can receive data transmitted from the transmission device based on the image imaged at the high frame rate. Therefore, in the case of performing the visible light communication, there was an issue that it was difficult to simply configure the reception device, because of the necessity to provide the reception device with such a special configuration.

In light of the foregoing, it is desirable to provide a novel and improved technology which is capable of simply configuring a reception device, and which is capable of transmitting data from a transmission device to the reception device without spoiling the beauty of the surroundings.

According to an embodiment of the present disclosure, there is provided a transmission device which includes an optical signal generation section configured to generate an optical signal formed by arranging one or more of each of a plurality of kinds of same-color light beams each having different phase, and a transmission section configured to transmit the optical signal generated by the optical signal generation section.

The optical signal generation section may generate the optical signal in a manner that light beams at positions corresponding, respectively, to positions of a plurality of pieces of information within transmission data, the plurality of pieces of information being held by the transmission data that is data to be transmitted, are set to be the same-color light beams having phases corresponding, respectively, to the plurality of pieces of information held by the transmission data.

When there are a plurality of pieces of the transmission data, the optical signal generation section may change a position of light corresponding to the transmission data for each of the pieces of transmission data.

The optical signal generation section may generate, as light other than light beams at positions corresponding, respectively, to positions of the plurality of pieces of information within the transmission data, light which has a same color as the plurality of kinds of same-color light beams and which has a phase that is different from any of phases of the plurality of kinds of same-color light beams. The transmission section may output the light generated by the optical signal generation section.

The transmission section may perform transmission of the optical signal to the reception device by projecting the optical signal generated by the optical signal generation section onto a predetermined area of an object, and by imaging, using a reception device, the area.

According to another embodiment of the present disclosure, there is provided a transmission method which includes generating an optical signal formed by arranging one or more of each of a plurality of kinds of same-color light beams each having different phase, and transmitting the optical signal.

According to another embodiment of the present disclosure, there is provided a reception device which includes a reception section configured to receive an optical signal formed by arranging one or more of a plurality of kinds of each of same-color light beams each having different phase, and an analysis section configured to acquire information corresponding to each of the same-color light beams arranged in the optical signal based on a phase that each of the same-color light beams arranged in the optical signal has.

The reception section may receive the optical signal by acquiring an image obtained by imaging sequentially in a predetermined direction an area onto which the optical signal is projected from the transmission device. The analysis section may acquire information corresponding to each of the same-color light beams arranged in the optical signal based on an arrangement of luminance, the arrangement being shot in the image differently for each of the kinds of the same-color light beams by performing imaging sequentially in the predetermined direction.

According to another embodiment of the present disclosure, there is provided a reception method which includes receiving an optical signal formed by arranging one or more of a plurality of kinds of each of same-color light beams each having different phase, and acquiring information corresponding to each of the same-color light beams arranged in the optical signal based on a phase that each of the same-color light beams arranged in the optical signal has.

According to another embodiment of the present disclosure, there is provided a communication system which includes a transmission device configured to transmit an optical signal formed by arranging one or more of each of a plurality of kinds of same-color light beams each having different phase, and a reception device configured to receive the optical signal transmitted from the transmission device.

According to another embodiment of the present disclosure, there is provided a communication method which includes transmitting an optical signal formed by arranging one or more of each of a plurality of kinds of same-color light beams each having different phase, and receiving the transmitted optical signal.

According to the embodiments of the present disclosure described above, the reception device can be simply configured, and data can be transmitted from the transmission device to the reception device without spoiling the beauty of the surroundings.

BRIEF DESCRIPTION OF THE DRAWINGS

FIG. 1 is a diagram illustrating an outline of a communication system according to the present embodiment;

FIG. 2 is a diagram showing flashing patterns of multiple kinds of same-color light beams, respectively, the multiple kinds of same-color light beams being included in an optical signal transmitted by a transmission device according to the present embodiment;

FIG. 5 is a diagram showing IDs obtained by analyzing, using the reception device according to the present embodiment, the images shown in FIG. 3C and FIG. 4C, respectively, and showing display examples of pieces of information acquired based on the IDs;

FIG. 9 is a diagram showing a functional configuration of the reception device according to the present embodiment; and FIG. 10 is a flowchart showing a flow of processing executed by the communication system according to the present embodiment.

DETAILED DESCRIPTION OF THE EMBODIMENT(S)

Figure 3A:
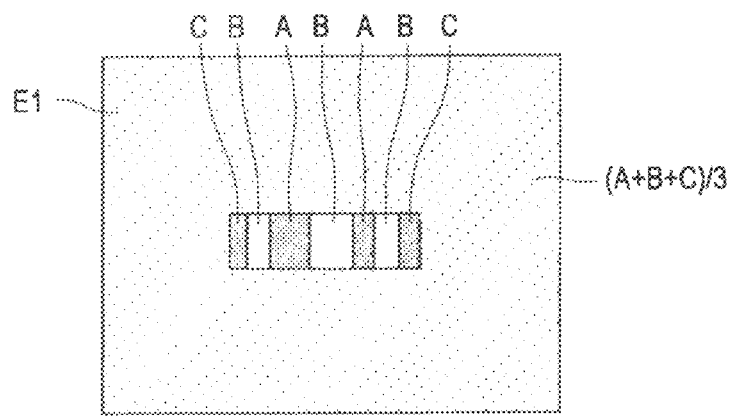
FIG. 3A is a diagram showing an image obtained by imaging, by a camera, approximately simultaneously an area onto which light including a first optical signal is projected using the transmission device according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the "detailed description of the embodiments" will be described in the order shown below.

1. Embodiment
 1-1. Outline of communication system
 1-2. Description on optical signal transmitted by transmission device
 1-3. Image obtained by imaging projected first optical signal
 1-4. Image obtained by imaging projected second optical signal
 1-5. Result obtained by analyzing image using reception device
 1-6. Functional configuration of transmission device
 1-7. Hardware configuration of transmission device
 1-8. Principle of controlling phase of light for each pixel
 1-9. Functional configuration of reception device
 1-10. Flow of processing executed by communication system
2. Modified example
3. Summary

1. EMBODIMENT

[1-1. Outline of Communication System]

FIG. 1 is a diagram illustrating an outline of a communication system according to the present embodiment. First, with reference to FIG. 1, the outline of the communication system according to the present embodiment will be described. As shown in FIG. 1, a communication system 10 according to the present embodiment includes a transmission device 100 and a reception device 200. The transmission device 100 transmits data to be transmitted to the reception device 200 (hereinafter, also referred to as "transmission data"), and the reception device 200 receives the transmission data transmitted from the transmission device 100. In the present embodiment, although there will be described a case where the transmission device 100 transmits information on an art object M which is put on display in an art museum as transmission data and the reception device 200 receives the transmission data, the transmission data is not limited thereto.

Here, for example, there is assumed a case of using a form of a general bar code such as a QR code (registered trademark) as a form of the transmission data. That is, for example, the transmission device 100 projects a bar code onto the art object M in a form that can be identified by the human eye. In the case where a user U thinks about trying to view information on the art object M while appreciating the art object M, for example, the user recognizes a position of the bar code projected onto the art object M, and images the position using a camera provided to the reception device 200. Accordingly, the reception device 200 decodes the bar code obtained by the imaging into the transmission data, and can obtain the information on the art object M.

However, when a general bar code is projected onto an object such as the art object M, the beauty of the art museum in which the art object M is put on display is spoiled, in the case where the bar code has a size of a certain level or more, for example. On the other hand, unless the bar code has a size of a certain level or more, it becomes difficult for the user U to recognize a position at which the bar code is embedded and to grasp the position to be imaged.

Further, in the case of performing visible light communication between the transmission device 100 and the reception device 200, the light projected from the transmission device 100 is modulated at high speed, and hence, there arises a necessity to provide the reception device 200 with a special configuration such as a special photosensor or a high-speed camera.

Consequently, in the present embodiment, the transmission device 100 generates an optical signal in which transmission data is encoded, and transmits the generated optical signal to the reception device 200. The optical signal generated here is configured from multiple kinds of same-color light beams each having different phase, and hence, the possibility can be reduced that the beauty of an object such as the art object M onto which the optical signal is projected is spoiled. Further, in the case where the transmission device 100 transmits such an optical signal, it is not necessary to provide the reception device 200 with the special configuration such as a special photosensor or a high-speed camera. Such technique will be described in detail in this specification.

[1-2. Description on Optical Signal Transmitted by Transmission Device]

FIG. 2 is a diagram showing flashing patterns of multiple kinds of same-color light beams, respectively, the multiple kinds of same-color light beams being included in an optical signal transmitted by the transmission device 100 according to the present embodiment. Note that the flashing pattern is shown by, for each kind of same-color light, associating an appearance of any one of a state in which the amount of light is higher than a predetermined value (ON-state) and a state in which the amount of light is lower than the predetermined value (OFF-state) with a time axis. The phase is shown by, for each kind of same-color light, associating a timing at which the state switches from the OFF-state to the ON-state with the time axis.

In FIG. 2, there are shown, same-color light A, same-color light B, and same-color light C as examples of the multiple kinds of same-color light beams whose flashing patterns are different from each other. Here, although there are shown three kinds of same-color light beams, the number of the kinds of same-color light beams is not limited to three, and may be any number as long as it is two or more. In this regard, when the number of the kinds of same-color light beams is increased, the amount of information that can be included per same-color light beam can be increased. Although the phases of the same-color light A, the same-color light B, and the same-color light C are different from each other, flashing cycles t1 thereof are the same with each other and time periods t2 thereof are the same with each other, the flashing cycle t1 representing a cycle of the state switching from the OFF-state to the ON-state and the time period t2 representing a time period during which the ON-state is continued. Accordingly, in the case where the integral of the amount of the same-color light A along the time, the integral of the amount of the same-color light B along the time, and the integral of the amount of the same-color light C along the time are compared with each other, they are the same. Therefore, when the flashing cycle t1 exceeds a predetermined cycle (when the flashing frequency f does not exceed a predetermined frequency), it is difficult to identify the switching between the ON-state and the OFF-state with the eyes of the user U, and hence, the same-color light A, the same-color light B, and the same-color light C look the same color. In the present embodiment, the optical signal is configured by arranging the multiple kinds of same-color light beams.

[1-3. Image Obtained by Imaging Projected First Optical Signal]

FIG. 3A is a diagram showing an image obtained by imaging, by a camera, approximately simultaneously an area onto which light including a first optical signal is projected using the transmission device 100 according to the present embodiment. As described above, the optical signal transmitted from the transmission device 100 is configured by arranging multiple kinds of same-color light beams (the same-color light A, the same-color light B, and the same-color light C). In FIG. 3A, in particular, there is shown as an example an image E1 obtained by imaging, by a camera, approximately simultaneously an area on the art object M onto which the light including the first optical signal is projected using the transmission device 100. The first optical signal is projected from the transmission device 100 particularly onto a head of the art object M, but the area to be projected onto is not particularly limited.

The image E1 shown in FIG. 3A, in particular, is obtained by imaging, by a camera, approximately simultaneously an area on the head of the art object M onto which light is projected using the transmission device 100, the light including the first optical signal in which light beams are arranged in the following order: the same-color light C, the same-color light B, the same-color light A, the same-color light B, the same-color light A, the same-color light B, and the same-color light C. As shown in FIG. 3A, the image E1 is shot such that an area onto which the same-color light B is projected exhibits high luminance and areas onto which the same-color light A and the same-color light C are projected, respectively, exhibit low luminance. That is, in the flashing patterns for each same-color light shown in FIG. 2, the image E1 is obtained by performing imaging at the time point when the same-color light B is at the ON-state (when the same-color light A and the same-color light C are each in the OFF-state).

In this way, it is difficult to specify an arrangement of the multiple kinds of same-color light beams from the image obtained by imaging, by a camera, approximately simultaneously the area onto which the light including the optical signal is projected, and the arrangement of the multiple kinds of same-color light beams can be specified when the area is imaged at high speed with a special photosensor and a high-speed camera. Note that an area shown as (A+B+C)/3 in the image E1 has a phase that is different from any of the phases of the same-color light A, the same-color light B, and the same-color light C, and is an area onto which the light of the same color as the color of the same-color light A, the same-color light B, and the same-color light C is projected. More specifically, the area is a place where light is projected, the light obtained by combining the same-color light A, the same-color light B, and the same-color light C, each of whose time period of the ON-state is set to one-third of the original time period of the ON-state, for example.

Figure 3B:
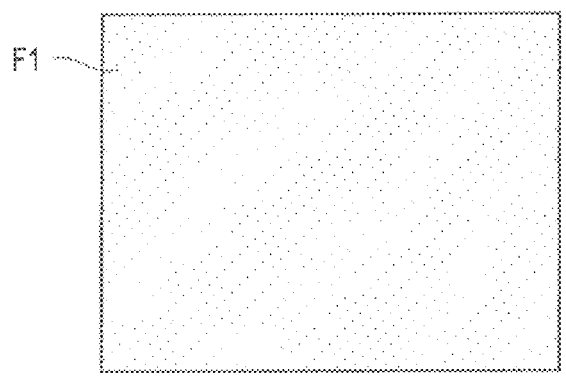
FIG. 3B is a diagram illustrating how the area onto which the light including the first optical signal is projected using the transmission device according to the present embodiment looks like to the human eye.

FIG. 3B is a diagram illustrating how the area onto which the light including the first optical signal is projected using the transmission device 100 according to the present embodiment looks like to the human eye. In FIG. 3B, in particular, there is shown as an example an image F1 showing how the area on the art object M onto which the light including the first optical signal is projected using the transmission device 100 looks like to the eyes of a human such as the user U. As can be seen from the image F1, when the predetermined conditions as described above are satisfied, the colors of the areas onto which the same-color light A, the same-color light B, and the same-color light C are projected, respectively, look the same with each other to the eyes of the user U. Further, the color of the area shown as (A+B+C)/3 in the image E1 also looks the same, to the eyes of the user U, as the colors of the areas onto which the same-color light A, the same-color light B, the same-color light C, and the like are projected.

Figure 3C:
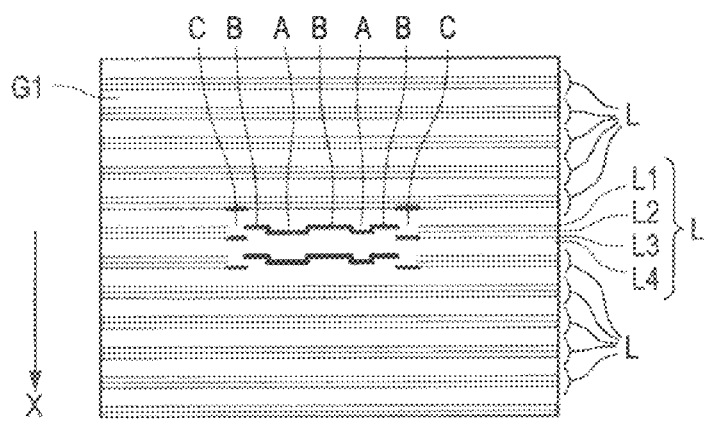
FIG. 3C is a diagram showing an image obtained by imaging sequentially in a predetermined direction, by a reception device according to the present embodiment, the area onto which the light including the first optical signal is projected using the transmission device according to the present embodiment.

FIG. 3C is a diagram showing an image obtained by imaging sequentially in a predetermined direction X, by the reception device 200 according to the present embodiment, the area onto which the light including the first optical signal is projected using the transmission device 100 according to the present embodiment. In FIG. 3C, in particular, there is shown as an example an image G1 obtained by imaging sequentially in the predetermined direction X, by the reception device 200, the area on the art object M onto which the light including the first optical signal is projected using the transmission device 100.

Referring to FIG. 3C, there are shown in the image G1 that the area onto which the light is projected is represented by a black color indicating that the luminance thereof is high, and that the area onto which the light is not projected is represented by a white color indicating that the luminance thereof is low. Within the image G1, the area onto which the same-color light A is projected, the area onto which the same-color light B is projected, and the area onto which the same-color light C is projected are shot such that respective arrangements of luminance are different from each other. This is because the image G1 is obtained by imaging sequentially in the predetermined direction X, by the reception device 200, the area onto which the light including the first optical signal is projected. The predetermined direction X is not particularly limited. Further, the image G1 is obtained by imaging the area onto which the light including the first optical signal is projected using the reception device 200, the imaging being performed sequentially in the predetermined direction X with respect to each line, and the time period from the imaging of one line to the imaging of the next line can be changed appropriately. Although the hardware to be used for performing the imaging sequentially in the predetermined direction X is not particularly limited, there is used a complementary metal oxide semiconductor (CMOS) image sensor, for example.

Referring to the image G1, the luminance of an area onto which each same-color light beam is projected becomes high every four lines. That is, in the case where four lines L (line L1 to line L4) are repeatedly shot in the image G1, the luminance of the line L2 becomes high in the area onto which the same-color light A is projected, the luminance of the line L1 becomes high in the area onto which the same-color light B is projected, and the luminance of the line L3 becomes high in the area onto which the same-color light C is projected.

In this manner, if there can be acquired the image obtained by imaging sequentially in the predetermined direction X the area onto which the light including the first optical signal is projected, the arrangement of the multiple kinds of same-color light beams can be specified based on the acquired image. The function of imaging sequentially in the predetermined direction X the area onto which the light including the first optical signal is projected can be realized by a CMOS image sensor, for example, and hence, it is not necessary to build a special photosensor, high-speed camera, or the like into the reception device 200.

[1-4. Image Obtained by Imaging Projected Second Optical Signal]

Figure 4A:
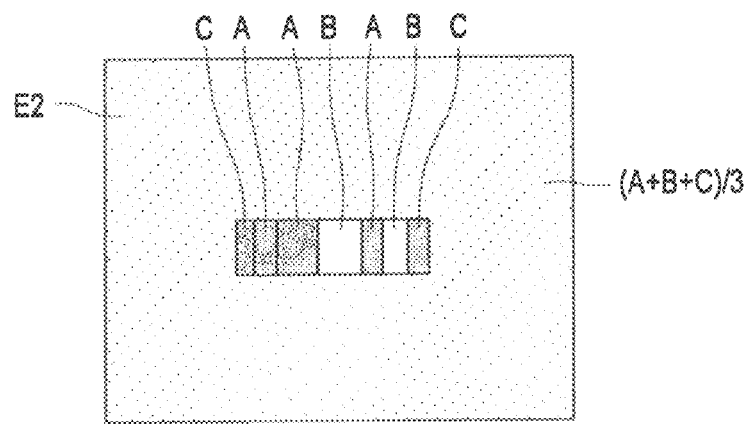
FIG. 4A is a diagram showing an image obtained by imaging, by a camera, approximately simultaneously an area onto which light including a second optical signal is projected using the transmission device according to the present embodiment.

FIG. 4A is a diagram showing an image obtained by imaging, by a camera, approximately simultaneously an area onto which light including a second optical signal is projected using the transmission device 100 according to the present embodiment. In FIG. 4A, in particular, there is shown as an example an image E2 obtained by imaging, by a camera, approximately simultaneously an area on the art object M onto which the light including the second optical signal is projected using the transmission device 100. The second optical signal is projected from the transmission device 100 particularly onto a torso of the art object M, but the area to be projected onto is not particularly limited.

The image E2 shown in FIG. 4A, in particular, is obtained by imaging, by a camera, approximately simultaneously an area on the torso of the art object M onto which light is projected using the transmission device 100, the light including the second optical signal in which light beams are arranged in the following order: the same-color light C, the same-color light A, the same-color light A, the same-color light B, the same-color light A, the same-color light B, and the same-color light C. As shown in FIG. 4A, the image E2 is shot, in the same manner as the image E1 shown in FIG. 3A, such that an area onto which the same-color light B is projected exhibits high luminance and areas onto which the same-color light A and the same-color light C are projected, respectively, exhibit low luminance.

Figure 4B:
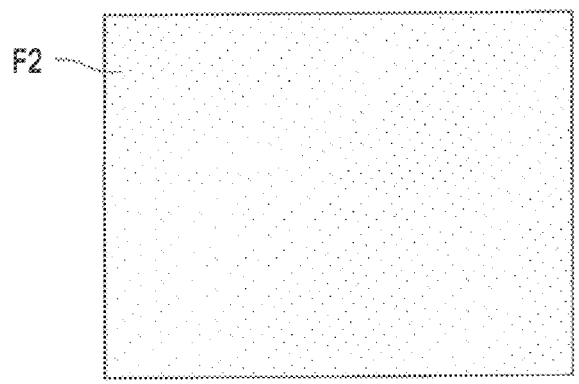
FIG. 4B is a diagram illustrating how the area onto which the light including the second optical signal is projected using the transmission device according to the present embodiment looks like to the human eye.

FIG. 4B is a diagram illustrating how the area onto which the light including the second optical signal is projected using the transmission device 100 according to the present embodiment looks like to the human eye. In FIG. 4B, in particular, there is shown as an example an image F2 showing how the area on the art object M onto which the light including the second optical signal is projected using the transmission device 100 looks like to the eyes of a human such as the user U. As can be seen from the image F2, when the predetermined conditions as described above are satisfied, the colors of the areas onto which the same-color light A, the same-color light B, and the same-color light C are projected, respectively, look the same with each other to the eyes of the user U. Further, the color of the area shown as (A+B+C)/3 in the image E2 also looks the same, to the eyes of the user U, as the colors of the areas onto which the same-color light A, the same-color light B, the same-color light C, and the like are projected.

Figure 4C:
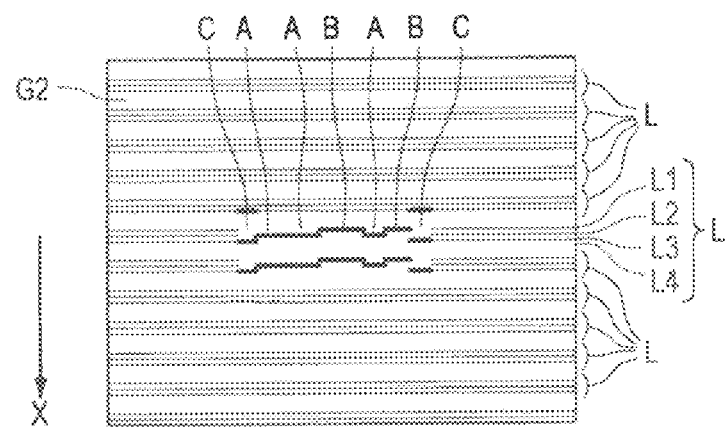
FIG. 4C is a diagram showing an image obtained by imaging sequentially in a predetermined direction, by the reception device according to the present embodiment, the area onto which the light including the second optical signal is projected using the transmission device according to the present embodiment.

FIG. 4C is a diagram showing an image obtained by imaging sequentially in a predetermined direction X, by the reception device 200 according to the present embodiment, the area onto which the light including the second optical signal is projected using the transmission device 100 according to the present embodiment. In FIG. 4C, in particular, there is shown as an example an image G2 obtained by imaging sequentially in the predetermined direction X, by the reception device 200, the area on the art object M onto which the light including the second optical signal is projected using the transmission device 100.

Referring to FIG. 4C, there are shown in the image G2 that the area onto which the light is projected is represented by a black color indicating that the luminance thereof is high, and that the area onto which the light is not projected is represented by a white color indicating that the luminance thereof is low. Within the image G2, the area onto which the same-color light A is projected, the area onto which the same-color light B is projected, and the area onto which the same-color light C is projected are shot such that respective arrangements of luminance are different from each other.

In this manner, the number of optical signals that can be transmitted by the transmission device 100 is not limited to one, and the transmission device 100 can transmit two optical signals (the first optical signal and the second optical signal). Further, the transmission device 100 is also capable of transmitting three or more optical signals. Further, in the present embodiment, the transmission device 100 projects the first optical signal onto the head of the art object M, the first optical signal being obtained by encoding information on the head of the art object M, and projects the second optical signal onto the torso of the art object M, the second optical signal being obtained by encoding information on the torso of the art object M. When the user U wants to view the information on the head of the art object M, the user U images the head of the art object M by a camera provided to the reception device 200, and when the user U wants to view the information on the torso of the art object M, the user U images the torso of the art object M by the camera provided to the reception device 200.

In the case of imaging the head of the art object M, the reception device 200 acquires the information on the head of the art object M based on the image obtained by imaging the head of the art object M and shows the information to the user U, and in the case of imaging the torso of the art object M, the reception device 200 acquires the information on the torso of the art object M based on the image obtained by imaging the torso of the art object M and shows the information to the user U. In this manner, according to the transmission device 100 of the present embodiment, multiple pieces of transmission data can be projected from one transmission device 100 onto places corresponding, respectively, to the pieces of transmission data as optical signals.

In the case of using general visible light communication, transmission data is encoded by converting the transmission data into a parameter on an optical time axis, which is called optical modulation. Therefore, it is difficult to change the optical signal depending on the place to be projected onto. According to the present embodiment, the transmission data is encoded by converting the transmission data into a parameter on a time axis and a parameter on a space axis, which represents conversion into an arrangement of light beams of the same color, each having different phase. Therefore, the optical signal is easily changed depending on the place to be projected onto.

[1-5. Result Obtained by Analyzing Image Using Reception Device]

FIG. 5 is a diagram showing IDs obtained by analyzing, using the reception device according to the present embodiment, the images shown in FIG. 3C and FIG. 4C, respectively, and showing display examples of pieces of information acquired based on the IDs. As described above, the image G1 shown in FIG. 3C, in particular, is obtained by imaging sequentially in the predetermined direction X, by the reception device 200, an area on the head of the art object M onto which light is projected using the transmission device 100, the light including the first optical signal in which light beams are arranged in the following order: the same-color light C, the same-color light B, the same-color light A, the same-color light B, the same-color light A, the same-color light B, and the same-color light C.

In the present embodiment, information corresponding to the same-color light A, information corresponding to the same-color light B, and information corresponding to the same-color light C are expressed as A, B, and C, respectively. Further, in the present embodiment, C is used as a start character and as an end character. The start character represents the start of a bit pattern, and the end character represents the end of the bit pattern. In the present embodiment, C is provided as the start character or the end character in addition to A and B that form the bit pattern. However, the start character and the end character may be expressed by A and B that form the bit pattern. For example, a predetermined number of consecutive A's may be regarded as the start character or the end character.

The reception device 200 acquires a bit pattern of an area onto which the first optical signal is projected by analyzing the image G1 obtained by the imaging, and converts the acquired bit pattern into an ID for identifying information to be viewed by the user U. In the present embodiment, the first optical signal is once converted into the ID, and the information to be viewed by the user U is to be acquired based on the ID. However, the reception device 200 may directly convert the acquired bit pattern into the information to be viewed by the user U. The information to be viewed by the user U is displayed on a display screen 251 included in the reception device 200, and the display example is shown in FIG. 5.

[1-6. Functional Configuration of Transmission Device]

Figure 6:
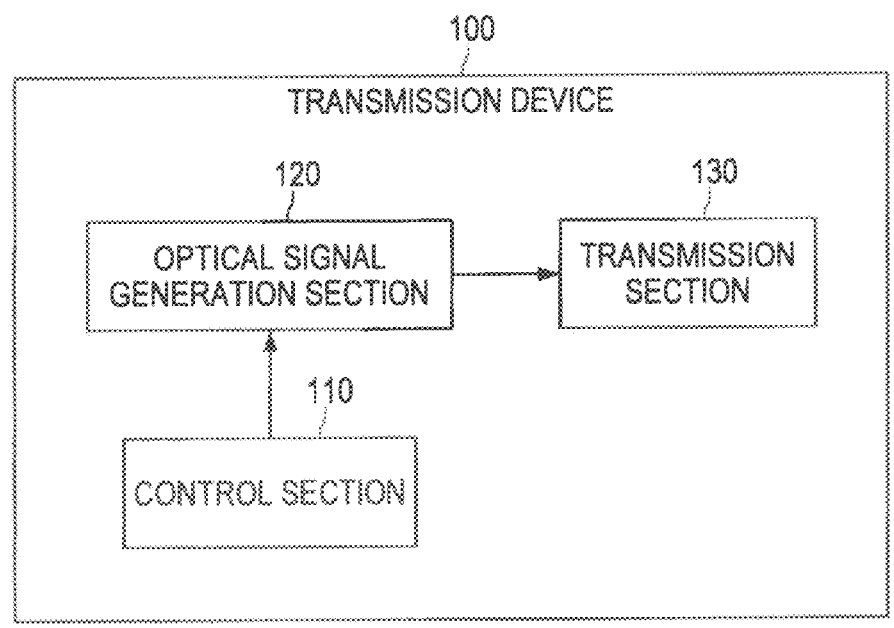
FIG. 6 is a diagram showing a functional configuration of the transmission device according to the present embodiment.

FIG. 6 is a diagram showing a functional configuration of the transmission device 100 according to the present embodiment. The transmission device 100 transmits an optical signal formed by arranging one or more of each of multiple kinds of same-color light beams each having different phase. Examples of the multiple kinds of same-color light beams each having different phase include, as described above, the same-color light A, the same-color light B, and the same-color light C. As examples in which one or more of each of the same-color light beams are arranged, there can be given the first optical signal and the second optical signal, as described above.

The transmission device 100 mainly includes a control section 110, an optical signal generation section 120, a transmission section 130, and the like. The control section 110 has a function of outputting a drive signal for controlling the optical signal generation section 120. For example, in the case where the control section 110 causes the optical signal generation section 120 to generate the first optical signal, a flashing pattern for each position of the first optical signal is output from the control section 110 to the optical signal generation section 120 as a drive signal, based on: information indicating an arrangement of the same-color light beams forming the first optical signal (information indicating that the order is as follows: the same-color light C, the same-color light B, the same-color light A, the same-color light B, the same-color light A, the same-color light B, and the same-color light C); information indicating a position onto which the first optical signal is projected (information indicating the head of the art object M); and the like. The position of the optical signal corresponds to a pixel to be described below.

Further, for example, in the case where the control section 110 causes the optical signal generation section 120 to generate the second optical signal, a flashing pattern for each position of the second optical signal is output from the control section 110 to the optical signal generation section 120 as a drive signal, based on: information indicating an arrangement of the same-color light beams forming the second optical signal (information indicating that the order is as follows: the same-color light C, the same-color light A, the same-color light A, the same-color light B, the same-color light A, the same-color light B, and the same-color light C); information indicating a position onto which the second optical signal is projected (information indicating the torso of art object M); and the like. As the drive signal, the drive signal stored in a storage section (not shown) included in the transmission device 100 may be read out by the control section 110 and used, or the drive signal stored in a recording medium provided outside the transmission device 100 may be read out by the control section 110 and used. Further, a signal received by a reception section (not shown) included in the transmission device 100 may be used as the drive signal by the control section 110.

The optical signal generation section 120 has a function of generating an optical signal formed by arranging one or more of each of multiple kinds of same-color light beams each having different phase based on the drive signal output from the control section 110. For example, in the case where a flashing pattern for each position of the first optical signal is output from the control section 110 as the drive signal, the optical signal generation section 120 generates the first optical signal in accordance with the flashing pattern for each position of the first optical signal. Further, for example, in the case where a flashing pattern for each position of the second optical signal is output from the control section 110 as the drive signal, the optical signal generation section 120 generates the second optical signal in accordance with the flashing pattern for each position of the second optical signal.

The transmission section 130 has a function of transmitting the optical signal generated by the optical signal generation section 120. In the present embodiment, the transmission section 130 performs the transmission of the optical signal to the reception device 200 by projecting the optical signal generated by the optical signal generation section 120 onto a predetermined area of an object such as the art object M, and by imaging, using the reception device 200, the area. Further, in the present embodiment, the first optical signal and the second optical signal are transmitted by the transmission section 130. The first optical signal is projected onto the head of the art object M by the transmission device 100 and imaged by the reception device 200, thereby being received, and the second optical signal is projected onto the torso of the art object M by the transmission device 100 and imaged by the reception device 200, thereby being received.

The object onto which the optical signal is projected by the transmission section 130 may be three-dimensional like the art object M or planar like a painting. This is because whether the object onto which the optical signal is projected is three-dimensional or planar, the projected optical signal can be imaged by the reception device 200 in the same way, owing to the feature of light that the light travels in straight lines.

The transmission data is configured from multiple pieces of information (such as A, B, and C), and the optical signal generation section 120 generates an optical signal in the following manner: light beams at positions corresponding, respectively, to positions of the pieces of information within the transmission data (for example, in the case of the first optical signal, the positions of C's in the transmission data are 1st and 7th positions, the positions of B's in the transmission data are 2nd, 4th, and 6th positions, and the positions of A's in the transmission data are 3rd and 5th positions) are set to be the same-color light beams (such as the same-color light A, the same-color light B, and the same-color light C) having phases corresponding, respectively, to the multiple pieces of information (such as A, B, and C) held by the transmission data. The generation of such an optical signal is controlled by a drive signal output from the control section 110, for example.

In the case where there are multiple pieces of transmission data, the optical signal generation section 120 is also capable of changing a position of light corresponding to the transmission data for each of the pieces of transmission data. In the example described above, transmission data "CBABABC" corresponding to the first optical signal and transmission data "CAABABC" corresponding to the second optical signal represent the multiple pieces of transmission data. The optical signal generation section 120 can make changes such that a position of light corresponding to the transmission data "CBABABC" is set to the head of the art object M and a position of light corresponding to the transmission data "CAABABC" is set to the torso of the art object M, for example. The generation of such an optical signal is controlled by a drive signal output from the control section 110, for example.

The optical signal generation section 120 may generate, as light other than light beams at positions corresponding, respectively, to positions of the multiple pieces of information (such as A, B, and C) within the transmission data (for example, light projected onto the area shown as "(A+B+C)/3" in FIG. 3A), light which has the same color as the multiple kinds of same-color light beams (the same-color light A, the same-color light B, and the same-color light C) and which has a phase that is different from any of the phases of the multiple kinds of same-color light beams. In that case, the transmission section 130 outputs the light generated by the optical signal generation section 120. For example, as described above, the light other than the light beams at the positions corresponding, respectively, to the positions of the multiple pieces of information (such as A, B, and C) within the transmission data may be set as light obtained by combining the same-color light A, the same-color light B, and the same-color light C, each of whose time period of the ON-state is set to one-third of the original time period of the ON-state, for example.

[1-7. Hardware Configuration of Transmission Device]

Figure 7:
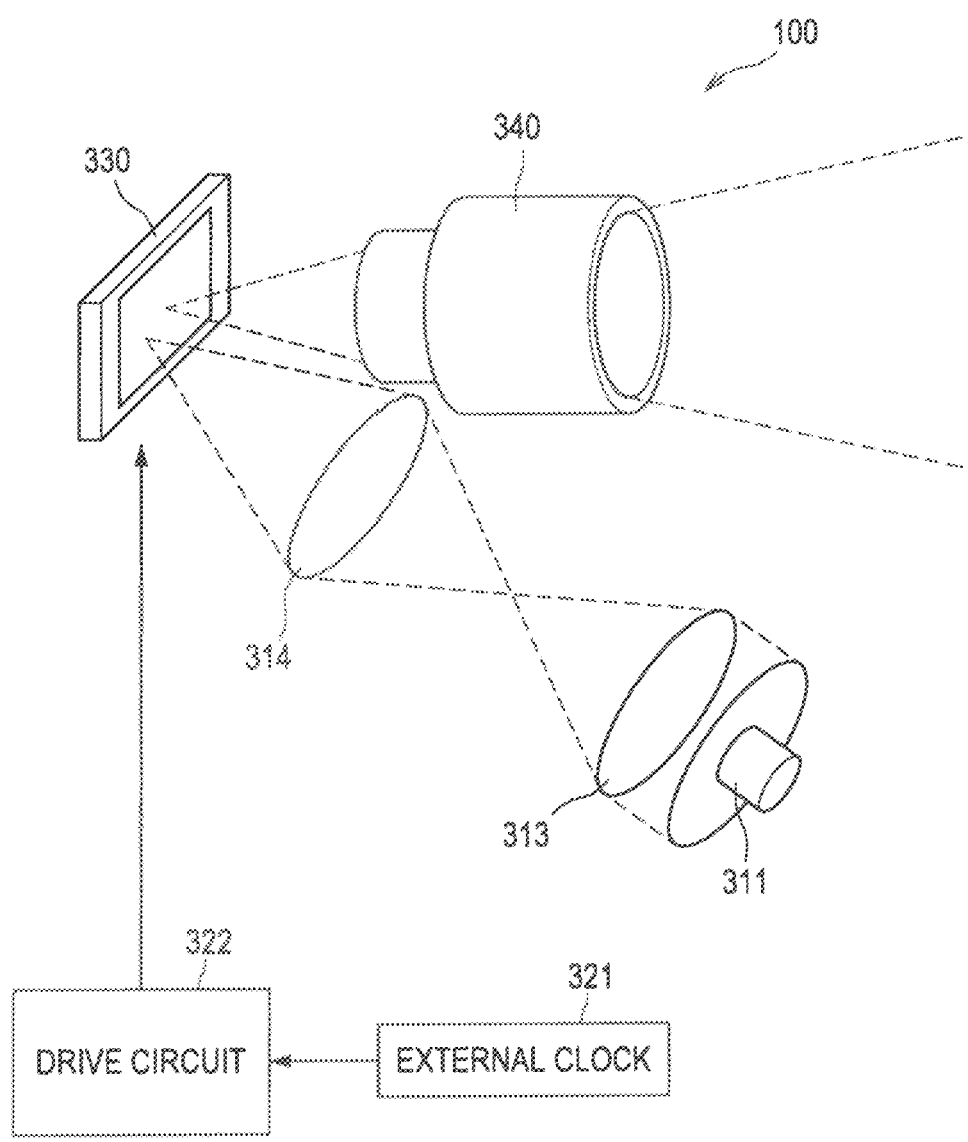
FIG. 7 is a diagram showing a hardware configuration of the transmission device according to the present embodiment.

FIG. 7 is a diagram showing a hardware configuration of the transmission device 100 according to the present embodiment. As shown in FIG. 7, the transmission device 100 mainly includes a light source 311, a lens 313, a lens 314, an external clock 321, a drive circuit 322, a DMD (Digital Micro-mirror Device) 330, a projector lens 340, and the like.

The light source 311 functions as a part of the optical signal generation section 120, for example, and has a function of emitting light. The light emitted from the light source 311 may be visible light such as white light, or may be infrared light that can be imaged by a camera provided to a mobile phone, such as near-infrared light. The light source 311 is configured from, for example, an ultra-high pressure mercury lamp, a xenon lamp, and the like.

The lens 313 is a lens for adjusting the light emitted from the light source 311 to the size of a color wheel which is to be provided under ordinary circumstances. In the present embodiment, since the light beams transmitted from the transmission device 100 are same-color light beams, it is not particularly necessary to provide the color wheel. Accordingly, the lens 313 is also not particularly necessary. The lens 314 is used for adjusting the light emitted from the light source 311 to the size of the DMD 330.

The external clock 321 is a device for generating a clock signal for measuring a timing for switching between ON-state and OFF-state of the same-color light (such as the same-color light A, the same-color light B, or the same-color light C), and for outputting the clock signal to the drive circuit 322. The drive circuit 322 has functions of generating the drive signal as described above based on the clock signal generated by the external clock 321 and outputting the drive signal to the DMD 330. The drive circuit 322 functions as an example of the control section 110 included in the transmission device 100.

The DMD 330 has a function of causing the light emitted from the light source 311 to be reflected at an angle determined for each position of the light based on the drive signal output from the drive circuit 322. Since the timing for switching between the ON-state and the OFF-state for each position of the light is output from the drive circuit 322 as the drive signal, the DMD 330 causes the light to be reflected on the projector lens 340 for each position of the light in accordance with the drive signal, or causes the light to be reflected on an absorber plate (not shown). The function that the DMD 330 has will be further described in detail with reference to FIG. 8. The DMD 330 functions as an example of the optical signal generation section 120 included in the transmission device 100.

The projector lens 340 has a function of transmitting the light reflected from the DMD 330. The projector lens 340 transmits, for example, the light reflected from the DMD 330 by projecting the light onto an object such as the art object M. The projector lens 340 functions as an example of the transmission section 130 included in the transmission device 100.

[1-8. Principle of Controlling Phase of Light for Each Pixel]

Figure 8:
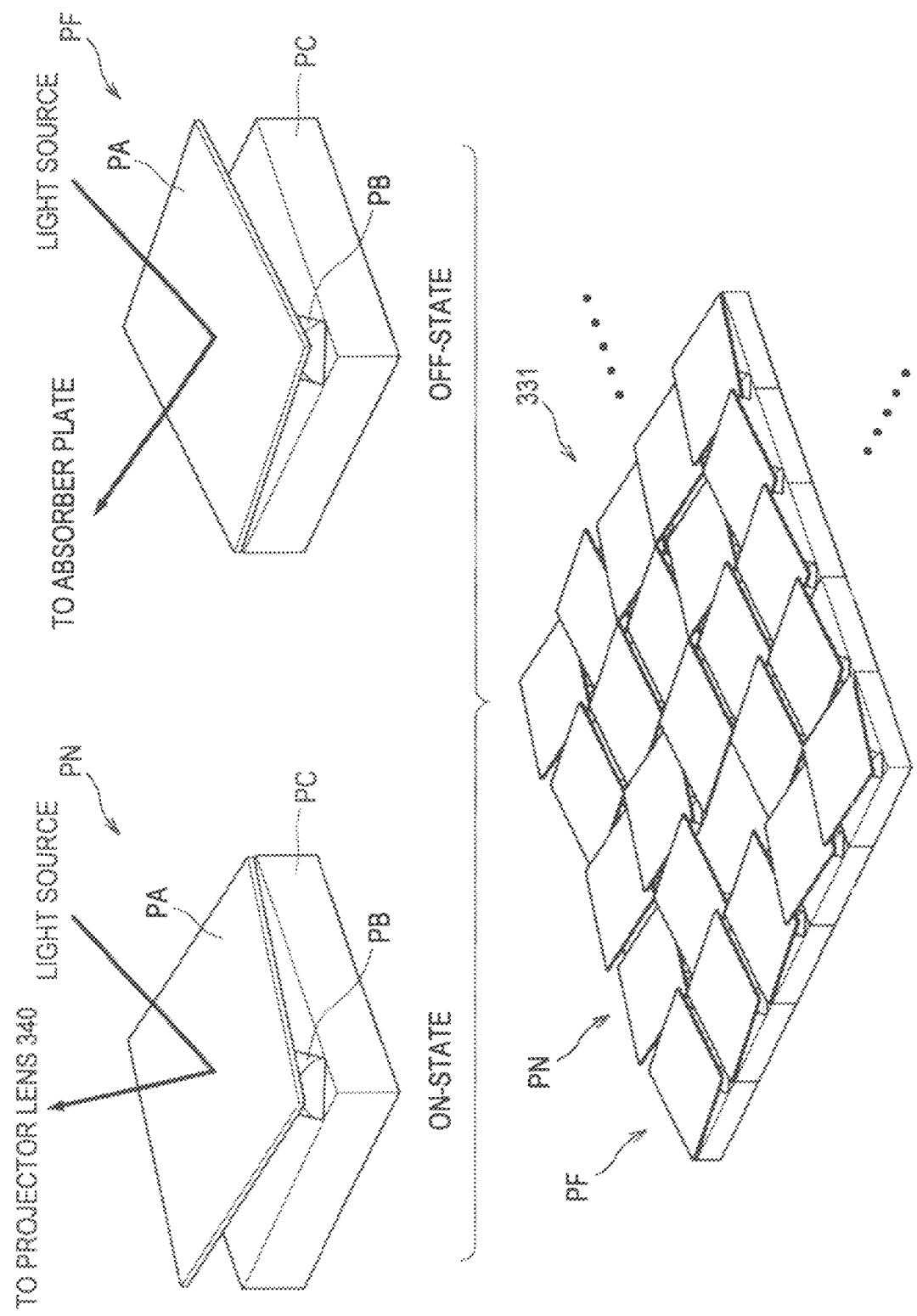
FIG. 8 is a diagram illustrating a principle of controlling, for each pixel, a phase of light applicable to the transmission device according to the present embodiment.

FIG. 8 is a diagram illustrating a principle of controlling, for each pixel, a phase of light applicable to the transmission device 100 according to the present embodiment. As shown in FIG. 8, the DMD 330 has, for each position of the light, a pixel including a mirror PA, an axle PB, and a base PC. There are two states in the pixel: a pixel PN indicating the ON-state; and a pixel PF indicating the OFF-state. The DMD 330 sets each pixel to the pixel PN indicating the ON-state or to the pixel PF indicating the OFF-state in accordance with the drive signal output from the drive circuit 322.

As shown in FIG. 8, the pixel PN indicating the ON-state reflects the light emitted from the light source 311 by the mirror PA onto the projector lens 340, for example. Further, the pixel PF indicating the OFF-state reflects the light emitted from the light source 311 by the mirror PA onto an absorber plate (not shown). The light reflected on the projector lens 340 is transmitted by the projector lens 340, and the light reflected on the absorber plate (not shown) is not transmitted by the projector lens 340. That is, the pixel PN indicating the ON-state creates the ON-state among the flashing pattern, and the pixel PF indicating the OFF-state creates the OFF-state among the flashing pattern.

As shown in FIG. 8, a mirror 331 is configured by arranging multiple pixels each controlled to set to any one of the pixel PN indicating the ON-state and the pixel PF indicating the OFF-state. The mirror 331 is provided to the DMD 330, and the switching to the pixel PN indicating the ON-state or the pixel PF indicating the OFF-state for each pixel is performed by the DMD 330 based on the drive signal. In this manner, the phase of the same-color light can be controlled for each position of the light. However, the technique of controlling the phase of the same-color light for each position of the light is not limited to the technique using the DMD 330. For example, the phase of the same-color light for each position of the light can be controlled using LED backlight.

[1-9. Functional Configuration of Reception Device]

FIG. 9 is a diagram showing a functional configuration of the reception device 200 according to the present embodiment. The reception device 200 receives, from the transmission device 100, an optical signal formed by arranging one or more of each of multiple kinds of same-color light beams each having different phase.

The reception device 200 mainly includes an imaging section 210, an image analysis section 220, an acquisition section 230, a storage section 240, a display section 250, and the like. The imaging section 210 functions as an example of a reception section, and has a function of receiving the optical signal. The imaging section 210 receives, for example, the optical signal by performing the imaging, and in the case of performing the imaging using a CMOS image sensor, for example, the optical signal can be imaged sequentially in the predetermined direction X as described above. Examples of the images obtained by performing the imaging using the imaging section 210 are as shown in FIG. 3C and FIG. 4C. Further, effects and the like achieved by imaging the optical signal sequentially in a predetermined direction are as described above.

The image analysis section 220 has a function of acquiring information corresponding to each of the same-color light beams arranged in the optical signal based on a phase that each of the same-color light beams arranged in the optical signal has. The image analysis section 220 functions as an example of an analysis section. More specifically, the image analysis section 220 acquires information corresponding to each of the same-color light beams arranged in the optical signal based on an arrangement of luminance, the arrangement being shot in the image differently for each of the kinds of the same-color light beams by performing imaging sequentially in the predetermined direction X. The image analysis section 220 analyzes the image obtained by being imaged by the imaging section 210 and acquires a bit pattern (ID and the like) from the image as an example of the information, for example.

The luminance of the pixel onto which the light is projected and the luminance of the pixel onto which the light is not projected are stored in the storage section 240, for example. That is, the image analysis section 220 acquires information corresponding to each of the same-color light beams arranged in the optical signal based on: the luminance stored in the storage section 240; and the arrangement of luminance, the arrangement being shot in the image differently for each of the kinds of same-color light beams by performing imaging sequentially in the predetermined direction X.

The acquisition section 230 has a function of acquiring information corresponding to an ID which is a result obtained by analyzing the image by the image analysis section 220. More specifically, as shown in FIG. 5, the acquisition section 230 acquires a description of "About Head of Statue" as information corresponding to an ID "BABAB", and acquires a description of "About Torso of Statue" as information corresponding to an ID "AABAB". Those pieces of information are also stored in the storage section 240, for example, and the acquisition section 230 can acquire the information corresponding to the ID from the storage section 240. Further, the acquisition section 230 may also receive those pieces of information from another device. Note that in the case where the information acquired by the image analysis section 220 is directly displayed by the display section 250, the acquisition section 230 is not necessarily provided to the reception device 200.

The display section 250 has a function of displaying the display screen 251 shown in the display example of FIG. 5. The display section 250 can cause the information acquired by the image analysis section 220 and the information acquired by the acquisition section 230 to be contained in the display screen 251 and can display the display screen 251.

The storage section 240 is capable of, as described above, storing various kinds of information used by the image analysis section 220 and the acquisition section 230. Further, in the case where the image analysis section 220 or the acquisition section 230 is configured from a CPU (Central Processing Unit), a RAM (Random Access Memory), or the like, the storage section 240 can store a program executed by the image analysis section 220 or the acquisition section 230.

[1-10. Flow of Processing Executed by Communication System]

FIG. 10 is a flowchart showing a flow of processing executed by the communication system 10 according to the present embodiment. First, the control section 110 of the transmission device 100 acquires transmission data (Step S101). A source from which the transmission data is acquired is not particularly limited as described above. After that, the control section 110 generates a drive signal based on the acquired transmission data (Step S102). Next, the optical signal generation section 120 converts light emitted from the light source 311 into an optical signal formed by arranging multiple kinds of same-color light beams each having different phase based on the drive signal (Step S103). The transmission section 130 projects the optical signal (Step S104).

The imaging section 210 of the reception device 200 images the optical signal transmitted by the transmission device 100 (Step S201). After that, the image analysis section 220 analyzes the image obtained by the imaging and acquires an ID (Step S202). The ID is, as described above, an example of the information acquired by the image analysis section 220. The acquisition section 230 acquires information corresponding to the ID (Step S203).

2. MODIFIED EXAMPLE

It should be understood by those skilled in the art that various modifications, combinations, sub-combinations and alterations may occur depending on design requirements and other factors insofar as they are within the scope of the appended claims or the equivalents thereof.

For example, in the present embodiment, the transmission device 100 projects the ID of the information on the head of the art object M onto the head of the art object M, and projects the ID of the information on the torso of the art object M onto the torso of the art object M. However, information to be projected is not limited. For example, when the transmission device 100 projects an ID of a place on all over the wall at the place as an invisible bar code, position recognition or the like using the reception device 200 can be realized.

3. SUMMARY

According to the present embodiment, it is possible to simply configure a reception device, and it is possible to transmit data from a transmission device to the reception device without spoiling the beauty of the surroundings. Further, according to the present embodiment, multiple pieces of transmission data can be projected as optical signals, from one transmission device, onto places corresponding to the pieces of transmission data, respectively.

The present disclosure contains subject matter related to that disclosed in Japanese Priority Patent Application JP 2010-127079 filed in the Japan Patent Office on Jun. 2, 2010, the entire content of which is hereby incorporated by reference.

What is claimed is:

1. A transmission device, comprising:
one or more circuits configured to:
generate an optical signal based on data that corresponds to an information area of an object onto which the optical signal is to be projected; and
transmit the generated optical signal,
wherein the optical signal includes a first light beam and a second light beam of different colors,
wherein each of the first light beam and the second light beam has a flashing pattern that shows a high-luminance state and a low-luminance state, and
wherein a timing of the high-luminance state of the first light beam of the optical signal is different from that of the second light beam,
represent the optical signal as a specific arrangement of the first light beam and the second light beam that are projected onto different positions in the information area and each have the high-luminance state,
wherein the specific arrangement is analyzed based on the optical signal received at different timings from a reception device.

2. The transmission device according to claim 1, wherein the one or more circuits are further configured to transmit the optical signal to the reception device by projection of the generated optical signal onto the information area of the object.

3. The transmission device according to claim 1, wherein at least one of the first light beam or the second light beam is infrared light.

4. The transmission device according to claim 1, wherein at least one of the first light beam or the second light beam is visible light.

5. The transmission device according to claim 1,
wherein the optical signal further includes a third light beam,
wherein the third light beam has a color different from those of the first light beam and the second light beam,
wherein the third light beam has a flashing pattern that shows the high-luminance state and the low-luminance state,
wherein a timing of the high-luminance state of the third light beam is different from those of the first light beam and the second light beam, and
wherein the optical signal is represented as the specific arrangement of the first light beam, the second light beam and the third light beam that are projected onto different positions in the information area and each have the high-luminance state.

6. The transmission device according to claim 5,
wherein the first light beam, the second light beam, and the third light beam are used as a bit pattern in an image generated by the optical signal,
wherein a combination of the first light beam and the second light beam is used as a specific information of the bit pattern in the image generated by the optical signal, and
wherein the third light beam is used as a start character and an end character of the bit pattern in the image generated by the optical signal.

7. The transmission device according to claim 6,
wherein the specific information corresponds to an identification information (ID) associated with a specific description.

8. The transmission device according to claim 1,
wherein the first light beam and the second light beam are used as a bit pattern in an image generated by the optical signal.

9. The transmission device according to claim 8,
wherein a combination of the first light beam and the second light is used as a specific information of the bit pattern in the image generated by the optical signal, and
wherein one of the first light beam or the second light beam is used as a start character and an end character of the bit pattern in the image generated by the optical signal.

10. The transmission device according to claim 9,
wherein a number of consecutive pattern units of the one of the first light beam or the second light beam is used as the start character and the end character.

11. The transmission device according to claim 1, wherein the one or more circuits are further configured to control a light source to project the first light beam and the second light beam of the optical signal onto the information area of the object.

12. The transmission device according to claim 11,
wherein the one or more circuits are further configured to control the light source to project a combined light beam onto a non-information area adjacent to the information area,
wherein the combined light beam includes the first light beam and the second light beam,
wherein timings of the high-luminance state of each of the first light beam and the second light beam of the combined light beam are different from those of the first light beam and the second light beam of the optical signal, and
wherein time integrals of luminance amounts of the first light beam and the second light beam of the combined light beam are respectively the same as those of the first light beam and the second light beam of the optical signal.

13. The transmission device according to claim 1,
wherein a time integral of a luminance amount of the first light beam of the optical signal is the same as that of the second light beam of the optical signal.

14. The transmission device according to claim 1,
wherein the high-luminance state of the first light beam has the same flashing pattern as that of the second light beam.

15. The transmission device according to claim 1,
wherein a sequential position, in an imaging direction in which at least one of the first light beam or the second light beam is projected, corresponds to a distinct portion of data encoded in the optical signal.

16. A transmission method, comprising:
generating an optical signal based on data that corresponds to an information area of an object onto which the optical signal is to be projected;
transmitting the generated optical signal,
wherein the optical signal includes a first light beam and a second light beam of different colors,
wherein each of the first light beam and the second light beam has a flashing pattern showing a high-luminance state and a low-luminance state, and
wherein a timing of the high-luminance state of the first light beam of the optical signal is different from that of the second light beam; and
representing an optical signal as a specific arrangement of the first light beam and the second light beam that are projected onto different positions in the information area and each have the high-luminance state,
wherein the specific arrangement is analyzed by receiving the optical signal at different timings with a reception device.

17. A reception device, comprising:
one or more circuits configured to:
receive an optical signal based on data that corresponds to an information area of an object onto which the optical signal is to be projected,
wherein the optical signal includes a first light beam and a second light beam of different color,
wherein each of the first light beam and the second light beam has a flashing pattern that shows a high-luminance state and a low-luminance state, and
wherein a timing of the high-luminance state of the first light beam of the optical signal is different from that of the second light beam;
analyze, based on the optical signal received at different timings, a specific arrangement of the first light beam and the second light beam that are projected onto different positions in the information area and each have the high-luminance state; and
acquire, based on the analyzed specific arrangement, information corresponding to the information area of the object.

18. A reception method, comprising:
receiving an optical signal based on data that corresponds to an information area of an object onto which the optical signal is to be projected,
wherein the optical signal includes a first light beam and a second light beam of different color,
wherein each of the first light beam and the second light beam has a flashing pattern showing a high-luminance state and a low-luminance state, and wherein a timing of the high-luminance state of the first light beam of the optical signal is different from that of the second light beam;

analyzing, based on the optical signal received at different timings, a specific arrangement of the first light beam and the second light beam that are projected onto different positions in the information area and each have the high-luminance state; and acquiring, based on the analyzed specific arrangement, information corresponding to the information area of the object.

19. A communication system, comprising:

a transmission device configured to:
transmit an optical signal based on data that corresponds to an information area of an object onto which the optical signal is to be projected,
wherein the optical signal includes a first light beam and a second light beam of different color,
wherein each of the first light beam and the second light beam has a flashing pattern that shows a high-luminance state and a low-luminance state, and
wherein a timing of the high-luminance state of the first light beam of the optical signal is different from that of the second light beam; and
represent the optical signal as a specific arrangement of the first light beam and the second light beam that are projected onto different positions in the information area and each have the high-luminance state; and a reception device configured to:
receive the optical signal at different timings to analyze the specific arrangement; and
acquire, based on the analyzed specific arrangement, information corresponding to the information area of the object.

20. A communication method, comprising:

transmitting an optical signal based on data that corresponds to an information area of an object onto which the optical signal is to be projected,
wherein the optical signal includes a first light beam and a second light beam,
wherein the first light beam has a color different from that of the second light beam,
wherein each of the first light beam and the second light beam has a flashing pattern showing a high-luminance state and a low-luminance state, and
wherein a timing of the high-luminance state of the first light beam of the optical signal is different from that of the second light beam;

representing the optical signal as a specific arrangement of the first light beam and the second light beam that are projected onto different positions in the information area and each have the high-luminance state;

receiving the optical signal at different timings to analyze the specific arrangement; and acquiring, based on the analyzed specific arrangement, information corresponding to the information area of the object.

* * * * *